Figure 1:
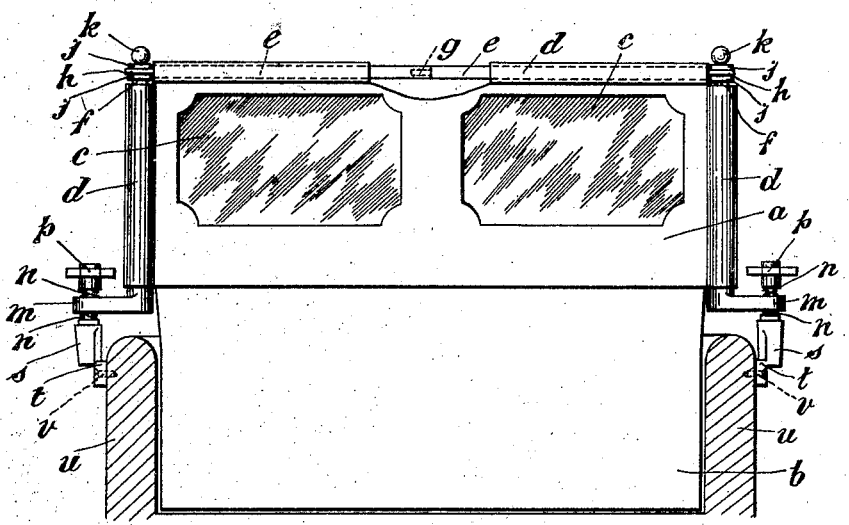

W. PITKIN.
WIND SCREEN FOR MOTOR CARS.
APPLICATION FILED APR. 3, 1922.

1,427,630. Patented Aug. 29, 1922.

Inventor
William Pitkin
By B. Singer Atty.

UNITED STATES PATENT OFFICE.

WILLIAM PITKIN, OF LONDON, ENGLAND.

WIND SCREEN FOR MOTOR CARS.

1,427,630.  Specification of Letters Patent.  Patented Aug. 29, 1922.

Application filed April 3, 1922. Serial No. 549,277.

*To all whom it may concern:*

Be it known that I, WILLIAM PITKIN, a subject of the King of Great Britain, and resident of London, England, have invented certain new and useful Improvements in and Relating to Wind Screens for Motor Cars, of which the following is a specification.

This invention relates to wind and weather screens for motor cars and other vehicles of the kind in which a screen of flexible material provided with one or more transparent sections is supported by side bars the lower ends of which are cranked and adjustably carried by rigid socket pieces, and the upper ends of which are connected together by means of a top cross bar. It has been proposed in this type of screen to connect the edges of the screen proper with the side and top bars by means of turn buttons or the like, and the top cross bar has been connected with the top of one side bar by means of a bifurcated end whilst the other end of the top bar has been hinged to the corresponding side bar, the rigid socket pieces carrying the said bars being mounted on the dashboard of the vehicle.

It is the object of this invention to provide an improved screen of simple construction which is disposed behind the driver's seat in order to protect the occupants of the rear seats, and which may be readily applied to the vehicle without alteration thereto such as is usually necessary with this type of screen, and without straining the back of the driver's seat.

The present invention consists of a wind screen for vehicle seats comprising a rectangular sheet of flexible material having an opening fitted with transparent material and having supporting tubes along its horizontal top and vertical sides. A horizontal removable rod extends through the tube at the top of the screen, and two detachable vertical rods extend through the side tubes of the screen respectively and detachably support at their upper ends the ends of the horizontal rod. The lower ends of the vertical rods are provided with supporting cranks adapted to be supported by two socket brackets provided with means for securing them to the sides of the vehicle, and each containing a removable vertical pivot pin. These vertical pivot pins are arranged to support the vertical rods by passing through pivot holes in the ends of the cranks of the vertical rods, and each end of the horizontal rod is detachably and rigidly connected to the top of one of the vertical rods, so that when either pivot pin is removed from its socket bracket the screen will be supported in the horizontal position from the other socket bracket.

Preferably each of the adjustable supporting brackets is constituted by a rigid bracket piece secured to the vehicle body and adapted pivotally to support a second bracket or crank the outer end of which carries eccentrically of the pivotal axis one of the side supporting bars, said brackets being connected together by means of a vertical post to which the second bracket is clamped so as to be rotatable thereon and which engages with the rigid bracket by means of a conical spigot joint the lower portion of which is squared so as to prevent relative rotation between said post and said rigid bracket.

The top cross bar may be formed in two parts connected together by a co-axial spigot and socket joint.

Figure 2:
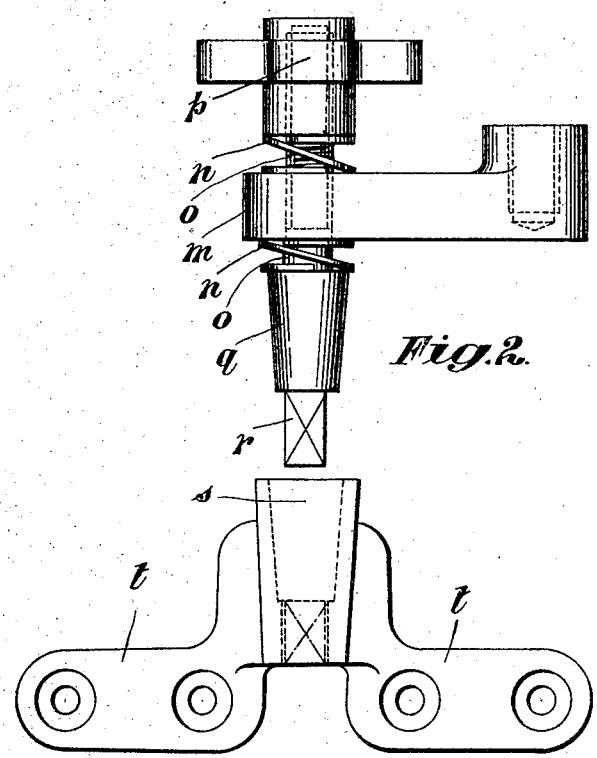
Figure 3:
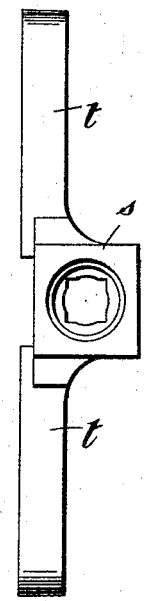

One form of the invention will be described with reference to the accompanying drawings of which Figure 1 is a front elevation, a portion being shown broken away for the sake of clearness, Figure 2 is an elevation to an enlarged scale of an adjustable bracket showing the parts separated and Figure 3 is a plan of a bracket base thereof.

As shown in Figure 1 a wind screen $a$ is made integral with an apron $b$ of leather, waterproof fabric or like flexible material and is provided with two apertures $c, c$ each covered by a sheet of mica, celluloid or similar transparent material.

The top and sides of the wind screen $a$ are formed with runners $d$ which receive respectively a cross bar $e$ and a pair of supporting side bars $f, f$, said bars being formed of round metal rod or tube. The cross bar $e$ is made in two sections connected as at $g$ by a co-axial spigot and socket joint, and the extremities of said bar $e$ are formed with bifurcated ends $h, h$ adapted to engage in slots between collars $j, j$ formed on the upper ends of the side bars $f, f$ said ends being provided with ornamental finials $k, k$. The lower end of each side bar $f$ is screwed into one end of a bracket $m$ the other end of which is clamped between a pair of spring washers $n, n$ upon a connecting post $o$ by means of a hand wheel nut $p$. The intermediate portion of the connecting post $o$ is tapered as at $q$ and its extremity is squared as at $r$ so that said post $o$ is adapted to fit non-rotatably in the tapered socket portion $s$ of a bracket base having integral lugs such as $t$ which are secured to the sides $u$ of the vehicle body by means of screws or the like $v$.

By suitably adjusting the bracket $m$ about the axis of the connecting post $o$ the screen $a$ may be held taut and rigid in its operative position.

If desired, the apron $b$ may be secured by hooks, turn buttons or the like to the rear of the front seat, or it may be left free so that it may be used to cover the feet and legs of the occupants of the rear seats.

In order to fold the screen when it is not required for use, one of the side bars $f$ is removed from its socket $s$ and its collars $j$ are disconnected from the corresponding fork $h$ of the cross bar $e$. Said cross bar $e$ is then drawn apart so as to disconnect the spigot joint $g$ and the whole of the screen $a$, apron $b$, cross bar $e$, and side bars $f$, $f$, together with their attachments, may be folded and rolled, if desired, into small space for packing.

If the screen be provided with only one aperture $c$ the cross bar $e$ should not be jointed at $g$, since the screen as a whole cannot be folded to smaller dimensions than those of each covered aperture $c$, but if the transparent material be sufficiently flexible the screen can be rolled up.

Normally the screen extends across the vehicle immediately in front of the rear seat, but in order to permit the entrance or exit of passengers one of the side bars $f$ may be removed from its socket $s$, and screen $a$ swung forwardly about the other side-bar $f$ into a position diagonally of the vehicle.

What I claim and desire to secure by Letters Patent is:—

1. A wind screen for vehicle seats, comprising a rectangular sheet of flexible material having an opening fitted with transparent material and having supporting tubes along its horizontal top and vertical sides, a horizontal removable rod extending through the tube at the top of the screen, two detachable vertical rods extending through the side tubes of the screen respectively, and detachably supporting at their upper ends the ends of the horizontal rod, and having at their lower ends supporting cranks, two socket brackets provided with means for securing them to the sides of the vehicle and each containing a removable vertical pivot pin, the vertical pivot pins being arranged to support the vertical rods by passing through pivot holes in the ends of the cranks of the vertical rods, and each end of the horizontal rod being detachably and rigidly connected to the top of one of the vertical rods so that when either pivot pin is removed from its socket bracket the screen will be supported in the horizontal position from the other socket bracket.

2. A wind screen in accordance with claim 1, wherein the ends of the horizontal screen supporting rod are bifurcated so that they will engage slots between collars secured at the upper ends of the vertical rods.

3. A wind screen in accordance with claim 1, wherein the horizontal rod is made in two sections connected together by a spigot and socket joint.

4. A wind screen in accordance with claim 1, wherein the pivot pins are secured in the ends of the cranks of the vertical rods between spring washers held in place by a nut screwed on the end of the pin.

5. A wind screen in accordance with claim 1, wherein the pivot pins are tapered at their lower ends to fit taper holes in the socket brackets and are provided at the lower portion with a squared end adapted to fit in a square hole in the lower portion of the socket.

In witness whereof I affix my signature.

WILLIAM PITKIN.